United States Patent
Shih et al.

(10) Patent No.: US 12,123,776 B2
(45) Date of Patent: Oct. 22, 2024

(54) SPECTROMETER

(71) Applicant: VisEra Technologies Company Ltd., Hsin-Chu (TW)

(72) Inventors: Wen-Yu Shih, Hsin-Chu (TW); Hsin-Yi Hsieh, Hsin-Chu (TW); Lai-Hung Lai, Hsin-Chu (TW); Po-Han Fu, Hsin-Chu (TW); Chin-Chuan Hsieh, Hsin-Chu (TW)

(73) Assignee: VisEra Technologies Company Ltd., Hsin-Chu (TW)

( * ) Notice: Subject to any disclaimer, the term of this patent is extended or adjusted under 35 U.S.C. 154(b) by 279 days.

(21) Appl. No.: 17/824,635

(22) Filed: May 25, 2022

(65) Prior Publication Data

US 2023/0408335 A1    Dec. 21, 2023

(51) Int. Cl.
  *G01J 3/28*   (2006.01)
  *G01J 3/02*   (2006.01)
  *G02B 1/11*   (2015.01)
  *G02B 5/18*   (2006.01)

(52) U.S. Cl.
  CPC ........... *G01J 3/2803* (2013.01); *G01J 3/0208* (2013.01); *G01J 3/0291* (2013.01); *G02B 1/11* (2013.01); *G02B 5/1866* (2013.01)

(58) Field of Classification Search
  CPC ...... G01J 3/2803; G01J 3/0208; G01J 3/0291; G01J 3/0256; G01J 3/0259; G01J 3/18; G02B 1/11; G02B 5/1866
  See application file for complete search history.

(56) References Cited

U.S. PATENT DOCUMENTS

| | | | | |
|---|---|---|---|---|
| 11,333,811 | B1 * | 5/2022 | Houck | G01J 3/2803 |
| 2001/0015850 | A1 * | 8/2001 | Kowarz | G02B 26/0808 |
| | | | | 359/572 |
| 2007/0070347 | A1 | 3/2007 | Scherer et al. | |

(Continued)

FOREIGN PATENT DOCUMENTS

| | | |
|---|---|---|
| CN | 103698010 | 4/2014 |
| CN | 110865431 | 3/2020 |

(Continued)

OTHER PUBLICATIONS

English Translation of Miyata et al WO2021070305A1 Description (Year: 2021).*

*Primary Examiner* — Tarifur R Chowdhury
*Assistant Examiner* — Akbar H. Rizvi
(74) *Attorney, Agent, or Firm* — LIU & LIU

(57) ABSTRACT

A spectrometer includes a plurality of photodetectors, an anti-reflection layer, a grating layer, a distant layer, and a collimator. The anti-reflection layer is disposed on the plurality of photodetectors. The grating layer is disposed above the anti-reflection layer and includes a plurality of grating structures to spread a light into a spectrum to the plurality of photodetectors through the distant layer. The distant layer continuously extends from the grating layer to the anti-reflection layer, the distant layer has a thickness in a range from 400 μm to 2000 μm, and a refractive index of the grating layer is greater than a refractive index of the distant layer. The collimator is disposed above the grating layer, in which the collimator is configured to confine an incident angle of the light from a first micro-lens.

20 Claims, 9 Drawing Sheets

(56) References Cited

U.S. PATENT DOCUMENTS

| | | | | |
|---|---|---|---|---|
| 2014/0092384 A1* | 4/2014 | Ebata | ................ | G01J 3/42 |
| | | | | 438/795 |
| 2020/0064195 A1* | 2/2020 | Gallinet | ................ | G01J 3/1895 |
| 2020/0363323 A1* | 11/2020 | Quaranta | ................ | G01J 3/0208 |
| 2021/0311226 A1* | 10/2021 | Liu | ................ | G02B 1/005 |
| 2022/0019015 A1* | 1/2022 | Calafiore | ................ | G02B 27/0172 |

FOREIGN PATENT DOCUMENTS

| | | | | |
|---|---|---|---|---|
| TW | 200602674 | | 1/2006 | |
| TW | 201414992 | | 4/2014 | |
| WO | 2021/058259 | | 4/2021 | |
| WO | WO-2021070305 A1 * | | 4/2021 | ........ G02B 27/1006 |

* cited by examiner

SPECTROMETER

BACKGROUND

Field of Invention

The present disclosure relates to a spectrometer with high resolution. More particularly, the present disclosure relates to a spectrometer with high resolution having a distant layer.

Description of Related Art

In the field of optics, a light spectrum could be analyzed by a variety of analytical instruments, such as a spectrometer or an interferometer. Despite the fact that a traditional grating spectrometer has high spectral sensitivity and large bandwidth of light, a volume of a traditional grating spectrometer is relatively large because it needs sufficient optical path length for coupling of light. An interferometer, such as Fabry-Perot interferometer, selectively transmits light with specific wavelengths, such that spectrum analysis could be achieved with a single filter. However, a cavity in the interferometer limits the spectral range, and so it may not be suitable in a broadband spectrum.

A waveguide grating device also could be used for analyzing a spectrum of light, but it is limited by specific incident angles and specific light wavelength, so the coupling efficiency of light on the waveguide grating may be poor. Therefore, there is a need to solve the above problems.

SUMMARY

One aspect of the present disclosure is to provide a spectrometer. The spectrometer includes a plurality of photodetectors, an anti-reflection layer, a grating layer, a distant layer, and a collimator. The anti-reflection layer is disposed on the plurality of photodetectors. The grating layer is disposed above the anti-reflection layer and includes a plurality of grating structures to spread a light into a spectrum to the plurality of photodetectors through the distant layer. The distant layer continuously extends from the grating layer to the anti-reflection layer, the distant layer has a thickness in a range from 400 µm to 2000 µm, and a refractive index of the grating layer is greater than a refractive index of the distant layer. The collimator is disposed above the grating layer, in which the collimator is configured to confine an incident angle of the light from a first micro-lens and increase a coupling efficiency of the light from the grating layer to the plurality of photodetectors.

According to some embodiments of the present disclosure, the collimator includes a pin hole aligned with the plurality of grating structures of the grating layer.

According to some embodiments of the present disclosure, the pin hole has a width in a range from 0.1 µm to 10 µm.

According to some embodiments of the present disclosure, the spectrometer further includes a second micro-lens aligned with the pin hole of the collimator, in which a second light-receiving surface of the second micro-lens is a concave surface.

According to some embodiments of the present disclosure, a projection of the plurality of grating structures on the anti-reflection layer overlaps a portion of the anti-reflection layer and a portion of the plurality of photodetectors.

According to some embodiments of the present disclosure, the spectrometer further includes an absorption layer disposed in the anti-reflection layer, in which the absorption layer is disposed below the grating structures and aside the plurality of photodetectors. The light has a critical angle between the grating layer and the distant layer, and the critical angle is in a range from 22 to 50 degrees. The light includes a second order diffraction light after the light propagates from the collimator and couples in the grating layer, and an incident angle of the second order diffraction light is greater than the critical angle. The light includes a zero order diffraction light and a first order diffraction light after the light couples out from the grating layer and couples in the distant layer, the absorption layer is configured to receive the zero order diffraction light, and the plurality of photodetectors are configured to receive the first order diffraction light.

According to some embodiments of the present disclosure, the anti-reflection layer is a conformal coating on the absorption layer and the plurality of photodetectors.

According to some embodiments of the present disclosure, calculating an optical resolution of the light is based on the following equation:

$$\frac{\Delta\lambda}{\Delta L}$$

where $\Delta\lambda$ is a wavelength range of the light, $\Delta L$ is a length difference between L1 and L2, where L1 equals T×tan(θ1), L2 equals T×tan(θ2), T is the thickness of the distant layer, and θ1 and θ2 respectively are minimum and maximum emergent angles of the light.

According to some embodiments of the present disclosure, $\Delta\lambda$ is in a range from 300 nm to 600 nm, and θ1 and θ2 ranges from 22.62° to 50.29°.

According to some embodiments of the present disclosure, $\Delta\lambda$ is in a range from 500 nm to 900 nm, and θ1 and θ2 ranges from 22.62° to 43.81°.

According to some embodiments of the present disclosure, $\Delta\lambda$ is in a range from 800 nm to 1200 nm, and θ1 and θ2 ranges from 23.58° to 36.87°.

According to some embodiments of the present disclosure, each of the plurality of grating structures include a binary grating structure, a step grating structure, a blazed grating structure, or a slanted grating structure.

According to some embodiments of the present disclosure, the binary grating structure includes a first vertical sidewall, a second vertical sidewall, and a first top surface. The first vertical sidewall is parallel to the second vertical sidewall, the first vertical sidewall adjoins and is perpendicular to the first top surface, and the second vertical sidewall adjoins and is perpendicular to the first top surface. A height of the binary grating structure is in a range from 0.25 µm to 0.4 µm.

According to some embodiments of the present disclosure, the step grating structure includes a first vertical sidewall, a second vertical sidewall, a third vertical sidewall, a fourth vertical sidewall, a first top surface, a second top surface, and a third top surface. The first vertical sidewall, the second vertical sidewall, the third vertical sidewall, and the fourth vertical sidewall are parallel to each other. The first top surface, the second top surface, and the third top surface adjoin and are perpendicular to the first vertical sidewall, the second vertical sidewall, the third vertical sidewall, and the fourth vertical sidewall.

According to some embodiments of the present disclosure, the blazed grating structure includes an oblique sidewall extending from a top of the blazed grating structure to a bottom of the blazed grating structure, and a width of the blazed grating structure gradually increases from the top of the blazed grating structure to the bottom of the blazed grating structure.

According to some embodiments of the present disclosure, the slanted grating structure includes a first oblique sidewall, a second oblique sidewall, and a top surface adjoining the first oblique sidewall and the second oblique sidewall.

According to some embodiments of the present disclosure, the grating layer further includes a grating substrate between the plurality of grating structures and the distant layer, and the plurality of grating structures protruding from the grating substrate.

According to some embodiments of the present disclosure, the first micro-lens is disposed above the collimator, and a first light-receiving surface of the first micro-lens is a convex surface.

According to some embodiments of the present disclosure, the spectrometer further includes a buffer layer disposed between the first micro-lens and the collimator, and a refractive index of the buffer layer is in a range from 1.5 to 2.2.

According to some embodiments of the present disclosure, the spectrometer further includes a cladding layer disposed between the grating layer and the collimator, wherein the refractive index of the grating layer is greater than a refractive index of the cladding layer, the refractive index of the cladding layer is in a range from 1.5 to 2.2, and the refractive index of the distant layer is in a range from 1.5 to 2.2.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
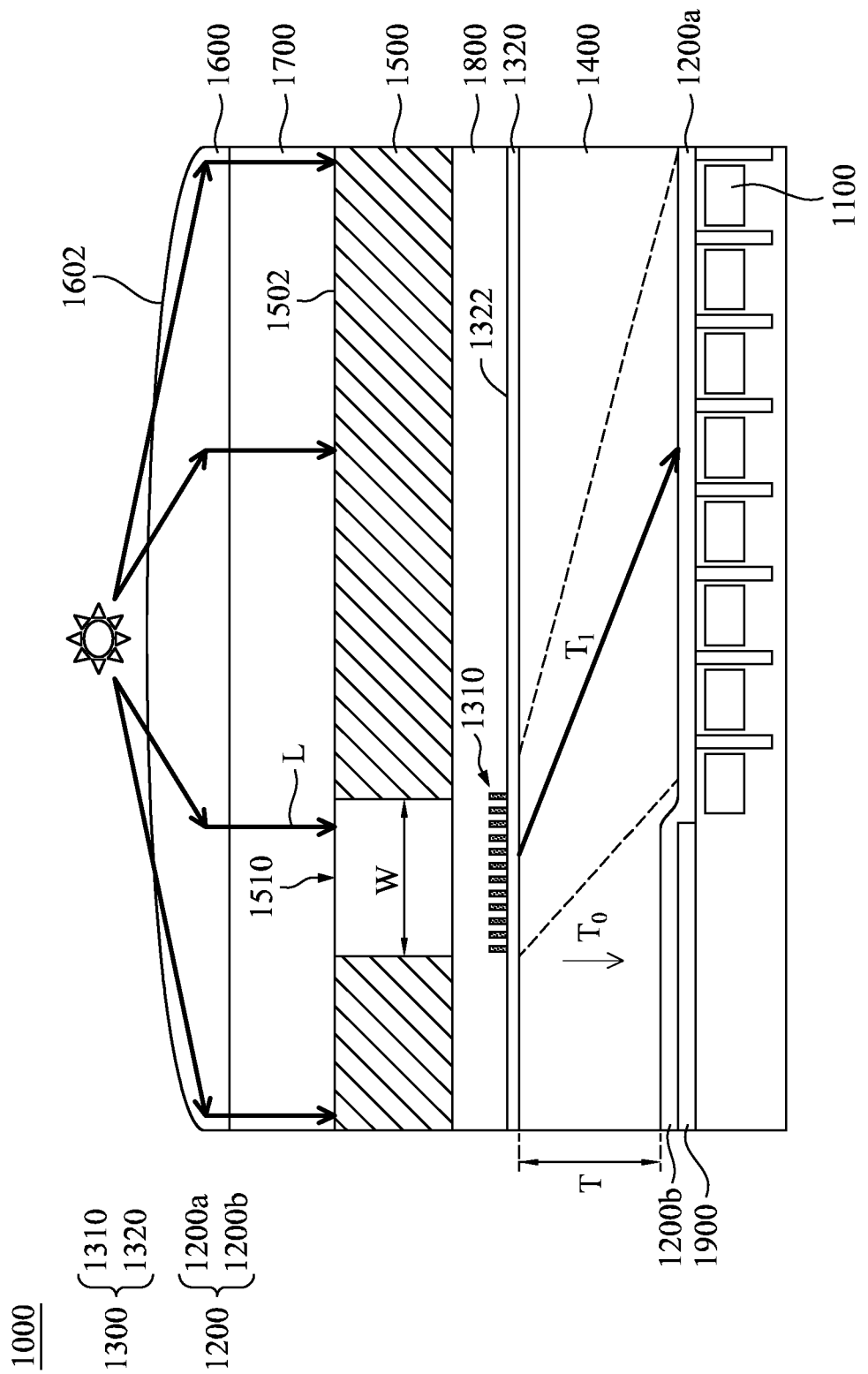
FIG. 1 is a cross-sectional view of a spectrometer in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. It should be understood that the number of any elements/components is merely for illustration, and it does not intend to limit the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As mentioned in the description of related art above, the traditional grating spectrometer may have the disadvantage of having a large size, the interferometer may be limited by the spectral range of light, and the waveguide grating device has the problem of low coupling efficiency of light. The present disclosure provides a spectrometer having miniaturization of a high-resolution grating spectrometer on a chip to solve the above problems. The spectrometer of the present disclosure includes a distant layer having a thickness at least 400 µm, and the spectrometer has the advantages of a miniaturized size, high resolution of the analysis results, readily integrated with complementary metal-oxide-semiconductor (CMOS) electronics, capable of covering a wide spectral range.

Hereinafter, several embodiments of the present invention will be disclosed with the accompanying drawings. Many practical details will be described in the following description for a clear description. However, it should be understood that these practical details should not be used to limit the present invention. That is, in some embodiments of the present invention, these practical details are unnecessary. In addition, in order to simplify the drawings, some conventional structures and elements will be shown in the drawings in a simple schematic manner.

With reference to FIG. 1, FIG. 1 is a cross-sectional view of a spectrometer 1000 in accordance with some embodiments of the present disclosure. The spectrometer 1000 includes a plurality of photodetectors 1100, an anti-reflection layer 1200, a grating layer 1300, a distant layer 1400, and a collimator 1500. The photodetector 1100 may be a Si photodetector, a Ge photodetector, or an organic photodetector. The plurality of photodetectors 1100 could be isolated by a plurality of deep trench insulation (DPI), as shown in FIG. 1. The anti-reflection layer 1200 is disposed on the plurality of photodetectors 1100. The anti-reflection layer 1200 is an anti-reflection coating (ARC) film. The anti-reflection layer 1200 is configured to increase the transmittance of the light L from the distant layer 1400 to the plurality of photodetectors 1100. A refractivity of the anti-reflection layer is less than 15%. The material of the anti-reflection layer 1200 may include organic multi-film material or inorganic multi-film material, such as $SiO_2$, SiH, or other suitable material. The grating layer 1300 is disposed above the anti-reflection layer 1200 and includes a plurality of grating structures 1310 to spread a light L into a spectrum to the plurality of photodetectors 1100 through a distant layer 1400.

The distant layer 1400 in FIG. 1 continuously extends from the grating layer 1300 (including the plurality of the grating structures 1310 and the grating substrate 1320) to the anti-reflection layer 1200. The distant layer 1400 has a thickness T in a range from 400 μm to 2000 μm, such as 600, 800, 1000, 1200, 1400, 1600, or 1800 μm. If the thickness T of the distant layer 1400 is less than 400 μm, it may not provide a high resolution of the spectrometer 1000. If the thickness T of the distant layer 1400 is greater than 2000 μm, it may not have the advantage of miniaturization of a high-resolution grating spectrometer on a chip. The distant layer 1400 having a thickness T at least 400 μm leads to the high-resolution spectrometer 1000 of the present disclosure. A refractive index of the distant layer 1400 is in a range from 1.5 to 2.2, such as 1.6, 1.8, or 2.0. The distant layer 1400 may be made from a low n polymer. A refractive index of the grating layer 1300 is greater than a refractive index of the distant layer 1400. The collimator 1500 is disposed above the grating layer 1300. The collimator 1500 is configured to confine an incident angle of the light L from a first micro-lens 1600 assuring the incident angle is around zero and increase a coupling efficiency of the light L from the grating layer 1300 to the plurality of photodetectors 1100. In other words, the collimator 1500 could revise the light L to increase the coupling efficiency of image pixels.

Figure 2A:
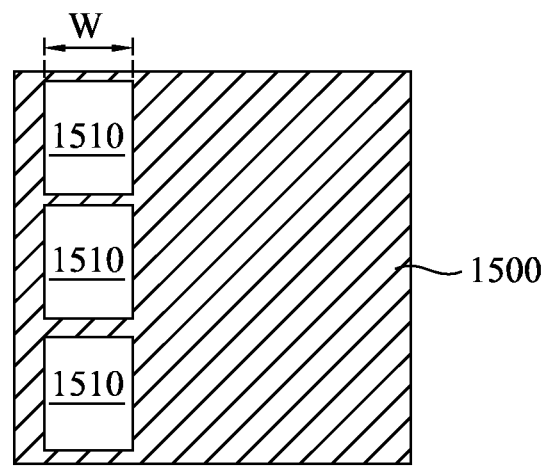
FIG. 2A is a top view of the collimator of the spectrometer in FIG. 1.

With reference to FIG. 2A, FIG. 2A is a top view of the collimator 1500 of the spectrometer 1000 in FIG. 1. The collimator 1500 in FIG. 1 and FIG. 2A includes a pin hole 1510 to confine the incident angle of the light L. The pin hole 1510 is served as a narrow entrance slit. The incident angle of the light L is in a range from 0 to ±3 degrees, such as 0.5, 1, 1.5, 2, or 2.5 degrees. Preferably, the incident angle of the light L is 0 degree. When the incident angle of the light L is 0 degree, the light L is vertical to a top surface 1502 of the collimator 1500. The pin hole 1510 of the collimator 1500 has a width W in a range from 0.1 to 10 μm, such as 0.5, 1, 2, 4, 6, or 8 μm. If the width W is smaller than 0.1 μm, it may not have sufficient amount of light transmitted into the grating layer 1300 below. If the width W is greater than 10 μm, the incident angle of the light L may be beyond a tolerance value, which leads to unexpected results of the optical resolution of the light L. Although the collimator 1500 illustrated in FIG. 2A has three pin holes 1510, the number of the pin hole 1510 is not limited in the present disclosure.

The grating layer 1300 in FIG. 1 includes a plurality of grating structures 1310. In some embodiments, the grating layer 1300 includes a grating substrate 1320 and the plurality of grating structures 1310 protruding from the grating substrate 1320. In other words, in some examples, the grating layer 1300 may have the grating substrate 1320 and the grating structures 1310 on the grating substrate 1320, as shown in FIG. 1. In other examples, the grating layer 1300 may not have the grating substrate 1320 below the grating structures 1310 (please refer to FIG. 9A), depending on the manufacturing process of the spectrometer 1000. In the case of the grating layer 1300 includes the grating substrate 1320 and the grating structures 1310, as shown in FIG. 1, the refractive index of the grating structures 1310 and a refractive index of the grating substrate 1320 may be the same or different. The refractive index of the grating structures 1310 and the refractive index of the grating substrate 1320 are in a range from 1.5 to 3.5, such as 1.8, 2.0, 2.2, 2.5, 2.8, 3.0, or 3.2. The grating structures 1310 and the grating substrate 1320 may be made from a high n polymer, such as $SiN_x$, $NbO_x$, $TaO_x$, $TiO_x$, $SiH_x$. The material of the grating structures 1310 and the grating substrate 1320 may be the same (please refer to FIG. 8E) or different (please refer to FIG. 1 and FIG. 9B). The various grating structures 1310 of the grating layer 1300 will be described in detail in FIG. 5A to FIG. 5D below.

Figure 2B:
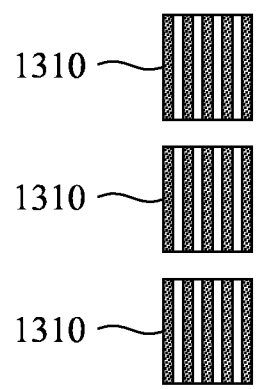
FIG. 2B is a top view of the plurality of grating structures of the spectrometer in FIG. 1.

With reference to FIG. 2B, FIG. 2B is a top view of the plurality of grating structures 1310 of the spectrometer 1000 in FIG. 1. As shown in FIG. 1, FIG. 2A, and FIG. 2B, the pin holes 1510 of the collimator 1500 are aligned with the grating structures 1310 of the grating layer 1300. The vertical layout of the pin holes 1510 of the collimator 1500 could prevent $T_{-1}$ diffraction light and/or high order diffraction light from propagating into the grating layer 1300 below the collimator 1500. Similarly, the vertical layout of the grating structures 1310 could prevent $T_{-1}$ diffraction light and/or high order diffraction light from propagating into the distant layer 1400 below the grating structures 1310.

Still refer to FIG. 1, the first micro-lens 1600 of the spectrometer 1000 is disposed above the collimator 1500, and a first light-receiving surface 1602 of the first micro-lens 1600 is a convex surface. Specifically, the first micro-lens 1600 refracts and converges external light to the internal of the spectrometer 1000.

As shown in FIG. 1, the spectrometer 1000 further includes a buffer layer 1700, a cladding layer 1800, and an absorption layer 1900. The buffer layer 1700 is disposed between the first micro-lens 1600 and the collimator 1500. A refractive index of the buffer layer 1700 is in a range from 1.5 to 2.2, such as 1.6, 1.8, or 2.0. The material of the buffer layer 1700 may be an organic material or inorganic material. The light transmittance of the buffer layer 1700 is greater than 80%. The cladding layer 1800 is disposed between the collimator 1500 and the grating layer 1300. Specifically, the cladding layer 1800 is disposed on the grating layer 1300. The refractive index of the grating layer 1300 is greater than a refractive index of the cladding layer 1800. In some embodiments, the refractive index of the grating structures 1310 of the grating layer 1300 is greater than the refractive index of the cladding layer 1800. In some embodiments, the refractive index of the cladding layer 1800 is in a range from 1.5 to 2.2, such as 1.6, 1.8, or 2.0.

The absorption layer 1900 in FIG. 1 is disposed in the anti-reflection layer 1200 and is disposed under the grating structures 1310. The absorption layer 1900 is disposed aside the plurality of photodetectors 1100. The absorption layer 1900 is configured to absorb a zero order ($T_0$) diffraction light, thereby avoiding $T_0$ diffraction light passing to the plurality of photodetectors 1100. The $T_0$ diffraction light herein is optical noise. The absorption coefficient K of the absorption layer 1900 is greater than 0.1. In some embodiments, the anti-reflection layer 1200 is a conformal coating on the absorption layer 1900 and the plurality of photodetectors 1100, and so a thickness of a first portion 1200a of the anti-reflection layer 1200 over the plurality of photodetectors 1100 is substantially the same as a thickness of a second portion 1200b of the anti-reflection layer 1200 over the absorption layer 1900. The absorption layer 1900 may be made from metal or other absorption material.

Figure 3:
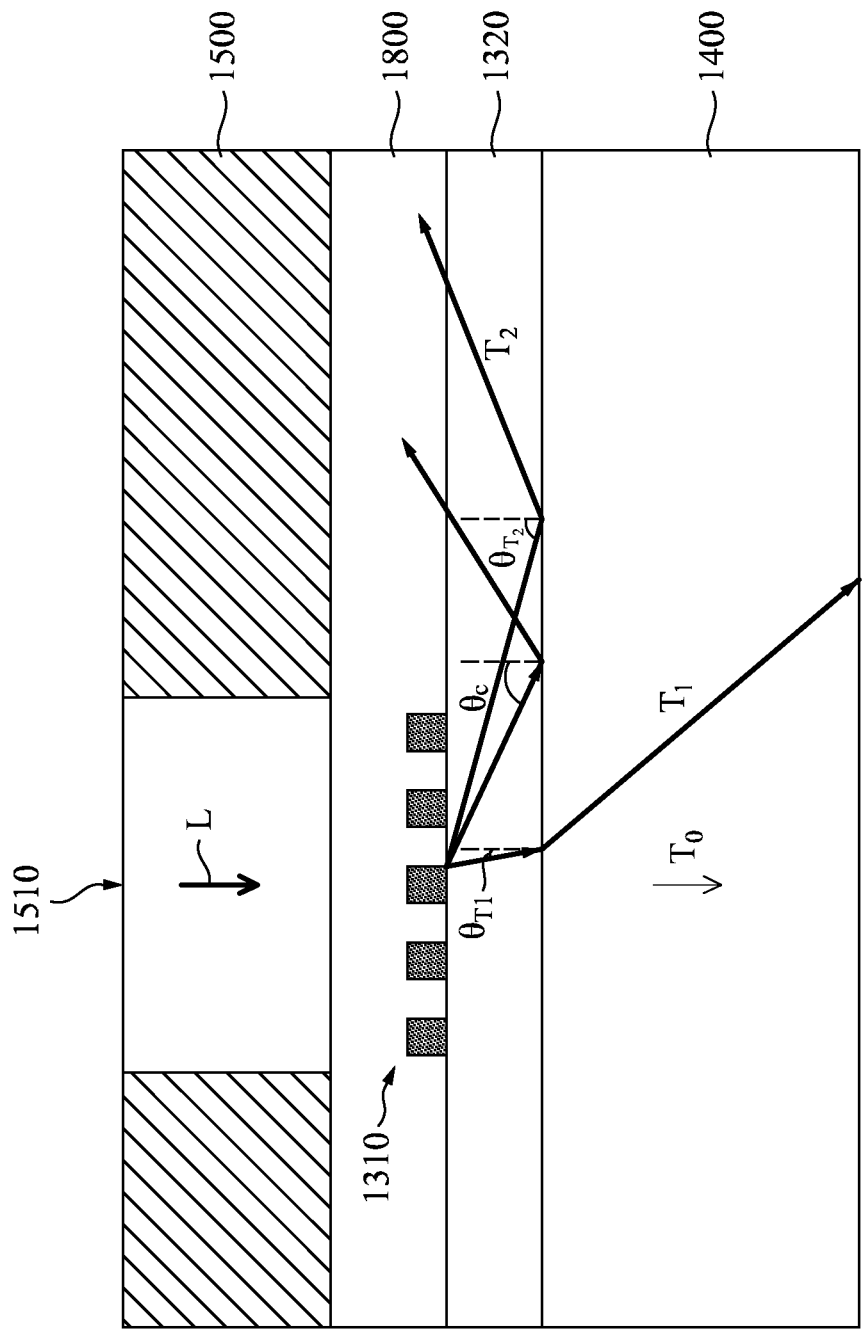
FIG. 3 is a partial view of the grating layer, the distant layer, the collimator, and the cladding layer of the spectrometer in FIG. 1.

With reference to FIG. 3, FIG. 3 is a partial view of the grating layer 1300, the distant layer 1400, the collimator 1500, and the cladding layer 1800 of the spectrometer 1000 in FIG. 1. After the light L passes through the pin hole 1510 of the collimator 1500, the light L passes through the cladding layer 1800 and propagates from the grating structures 1310 and the grating substrate 1320 of the grating layer 1300 into the distant layer 1400. The light L has a critical angle $\theta_c$ between the grating substrate 1320 and the distant layer 1400. Specifically, if the incident angle $\theta_{T1}$ of a first order ($T_1$) diffraction light is less than the critical angle $\theta_c$, the light L will transmit into the distant layer 1400. If the incident angle $\theta_{T1}$ of $T_1$ diffraction light is greater than the critical angle $\theta_c$, the light L will occur total internal reflection (TIR) at the interface between the grating substrate 1320 and the distant layer 1400. The $T_1$ diffraction light is the light that could be received by the plurality of photodetectors 1100 (please refer to FIG. 1). As shown in FIG. 3, an incident angle $\theta_{T2}$ of a second order ($T_2$) diffraction light is greater than the critical angle $\theta_c$, so that the $T_2$ diffraction light will occur TIR to filter out the $T_2$ diffraction light. In some embodiments, the critical angle $\theta_c$ is in a range from 22 to 50 degrees, for example, 22.62 to 50 degrees. In some embodiments, the refractive index of the grating structures 1310 is greater than the refractive index of the distant layer 1400. The more the difference between the refractive index of the grating structures 1310 and the refractive index of the distant layer 1400, the coupling efficiency of the grating structures 1310 to the distant layer 1400 would be better.

Figure 4:
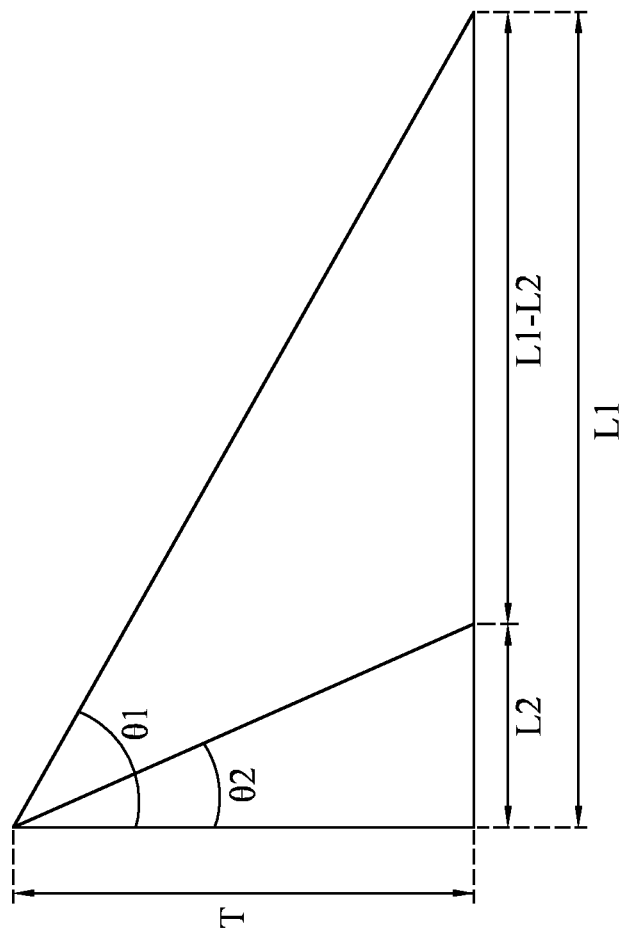
FIG. 4 is a partial view of the distant layer of the spectrometer in FIG. 1 after the light transmits from the grating layer into the distant layer.

With reference to FIG. 4, FIG. 4 is a partial view of the distant layer 1400 of the spectrometer 1000 in FIG. 1 after the light L transmits from the grating layer 1300 into the distant layer 1400. Specifically, calculating an optical resolution of the light L is based on the following equation:

$$\frac{\Delta\lambda}{\Delta L}$$

where $\Delta\lambda$ is a wavelength range of the light L, $\Delta L$ is a length difference between a length L1 and a length L2. The length L1 equals $T \times \tan(\theta 1)$, the length L2 equals $T \times \tan(\theta 2)$, the thickness T is a thickness of the distant layer 1400, and a emergent angle (diffraction angle) $\theta 1$ and a emergent angle (diffraction angle) $\theta 2$ respectively are minimum and maximum emergent angles of the light L. More specifically, a range that the length difference between the length L1 and the length L2 could be received by the light L spreading into a spectrum to the plurality of photodetectors 1100.

For example, please refer to FIG. 4, the optical resolution of the light L having a wavelength in a range from 300 nm to 600 nm when the thickness T of the distant layer 1400 is 400 µm (T=400 µm), where the emergent angle $\theta 1$=50.29° and the emergent angle $\theta 2$=22.62°. The optical resolution $$\left(\frac{\Delta\lambda}{\Delta L}\right)$$

of the spectrometer 1000 would be obtained by the dispersion in nm/pixel. Length L1=400 µm×tan(50°)=476 µm, length L2=400 µm×tan(22.62°)=166 µm, and length difference L1−L2=476 µm−166 µm=310 µm. The optical resolution at wavelengths from 300 nm to 600 nm would be about $$\frac{600-300\,(nm)}{476-166\,(\mu m)} = 0.97\left(\frac{nm}{\mu m}\right).$$

With the similar calculation method mentioned above, the light L having a wavelength in a range from 500 nm to 900 nm and the thickness T of the distant layer 1400 is 400 µm, the optical resolution would be about $$1.83\left(\frac{nm}{\mu m}\right)$$

The light L having a wavelength in a range from 800 nm to 1200 nm, the optical resolution would be about $$3.2\left(\frac{nm}{\mu m}\right).$$

It can be seen from Table 1 below. Table 1 shows examples of the optical resolutions of the light L in various wavelength ranges and various thicknesses T of the distant layer 1400. In some embodiments, the thickness T of the distant layer 1400 in a range from 400 µm to 2000 µm. In some embodiments, $\Delta\lambda$ is in a range from 300 nm to 600 nm, $\theta 1$ and $\theta 2$ ranges from 22.62° to 50.29°, and the resulted optical resolution of the light L is in a range from 0.317 nm/µm to 0.97 nm/µm. In some embodiments, $\Delta\lambda$ is in a range from 500 nm to 900 nm, $\theta 1$ and $\theta 2$ ranges from 22.62° to 43.81°, and the resulted optical resolution of the light L is in a range from 0.61 nm/µm to 1.83 nm/µm. In some embodiments, $\Delta\lambda$ is in a range from 800 nm to 1200 nm, $\theta 1$ and $\theta 2$ ranges from 23.58° to 36.87°, and the resulted optical resolution of the light L is in a range from 1.06 nm/µm to 3.2 nm/µm.

TABLE 1

| wavelength | 300 nm~600 nm | 500 nm~900 nm | 800 nm~1200 nm |
|---|---|---|---|
| diffraction angle | 300 nm @$\theta 1$ = 22.62°, 600 nm @$\theta 2$ = 50.29° | 500 nm @$\theta 1$ = 22.62°, 900 nm @$\theta 2$ = 43.81° | 800 nm @$\theta 1$ = 23.58° 1200 nm @$\theta 2$ = 36.87° |
| distant layer T = 400 µm | 0.97 nm/µm | 1.83 nm/µm | 3.2 nm/µm |
| distant layer T = 600 µm | 0.63 nm/µm | 1.22 nm/µm | 2.12 nm/µm |
| distant layer T = 800 µm | 0.47 nm/µm | 0.92 nm/µm | 1.59 nm/µm |

TABLE 1-continued

| wavelength | 300 nm~600 nm | 500 nm~900 nm | 800 nm~1200 nm |
|---|---|---|---|
| distant layer T = 1200 μm | 0.317 nm/μm | 0.61 nm/μm | 1.06 nm/μm |

Figure 5B:
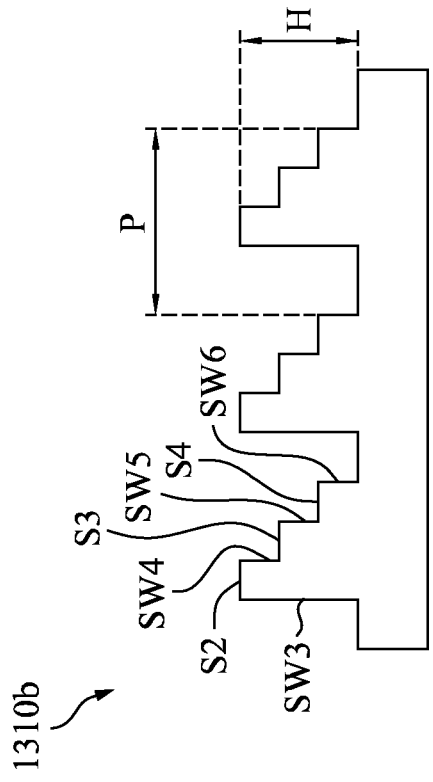
FIG. 5A to FIG. 5D are enlargement views of various grating structures of the grating layer of the spectrometer in FIG. 1.
Figure 5D:
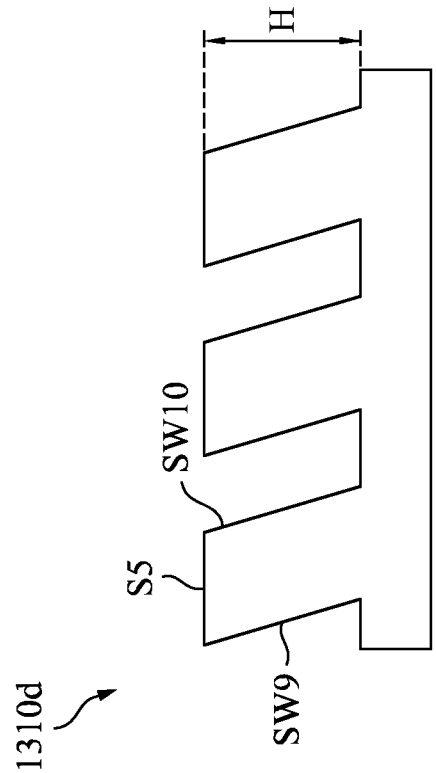
Figure 5A:
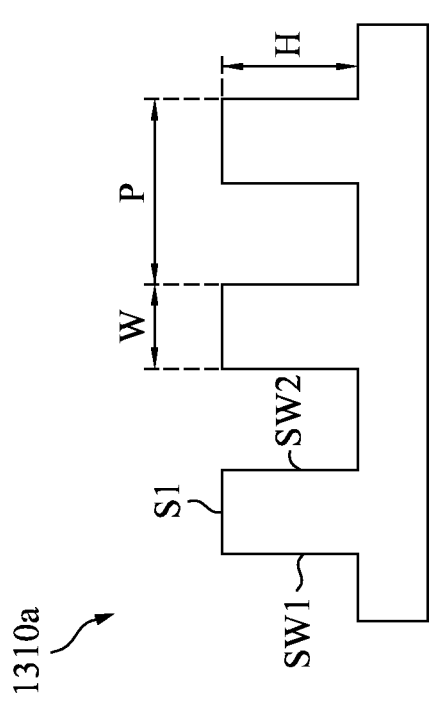

With reference to FIG. 5A to FIG. 5D, FIG. 5A to FIG. 5D are enlargement views of various grating structures 1310 of the grating layer 1300 of the spectrometer 1000 in FIG. 1. As shown in FIG. 5A, the binary grating structure 1310a includes a first vertical sidewall SW1, a second vertical sidewall SW2, and a first top surface S1. The first vertical sidewall SW1 is substantially parallel to the second vertical sidewall SW2, the first vertical sidewall SW1 is substantially perpendicular to the first top surface S1, and the second vertical sidewall SW2 is substantially perpendicular to the first top surface S1. The binary grating structure 1310a has a width W, a height H, and a period P, in which the period P is defined by a distance between two binary grating structures 1310a. In some embodiments, the period P is in a range from 0.25 to 0.4 μm, such as 0.3, or 0.35 μm. In some embodiments, the height H is in a range from 0.25 to 0.4 μm, such as 0.3 μm. In some embodiments, a fill factor (FF=width/period) is in a range from 0.4 to 0.6, such as 0.45, 0.5, or 0.55. In some embodiments, the binary grating structures 1310a include different periods P, but have the same height H.

Figure 5C:
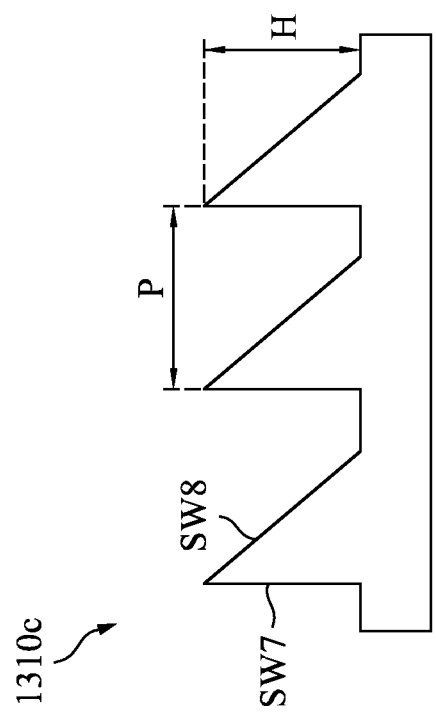

As shown in FIG. 5B, the step grating structure 1310b includes a third vertical sidewall SW3, a fourth vertical sidewall SW4, a fifth vertical sidewall SW5, a sixth vertical sidewall SW6, a second top surface S2, a third top surface S3, and a fourth top surface S4. The third vertical sidewall SW3, the fourth vertical sidewall SW4, the fifth vertical sidewall SW5, and the sixth vertical sidewall SW6 are substantially parallel to each other. The second top surface S2, the third top surface S3, and the fourth top surface S4 are substantially perpendicular to the fourth vertical sidewall SW4, the fifth vertical sidewall SW5, and the sixth vertical sidewall SW6. In some embodiments, a step number of the step grating structures 1310b is greater than 3. In some embodiments, the step grating structures 1310b include different periods P, but have the same height H. As shown in FIG. 5C, the blazed grating structure 1310c includes a seventh vertical sidewall SW7 and an eighth sidewall SW8. The eighth sidewall SW8 is an inclined sidewall. The seventh vertical sidewall SW7 and the eighth sidewall SW8 form an angle. In some embodiments, the blazed grating structures 1310c include different periods P, but have the same height H.

Figure 6:
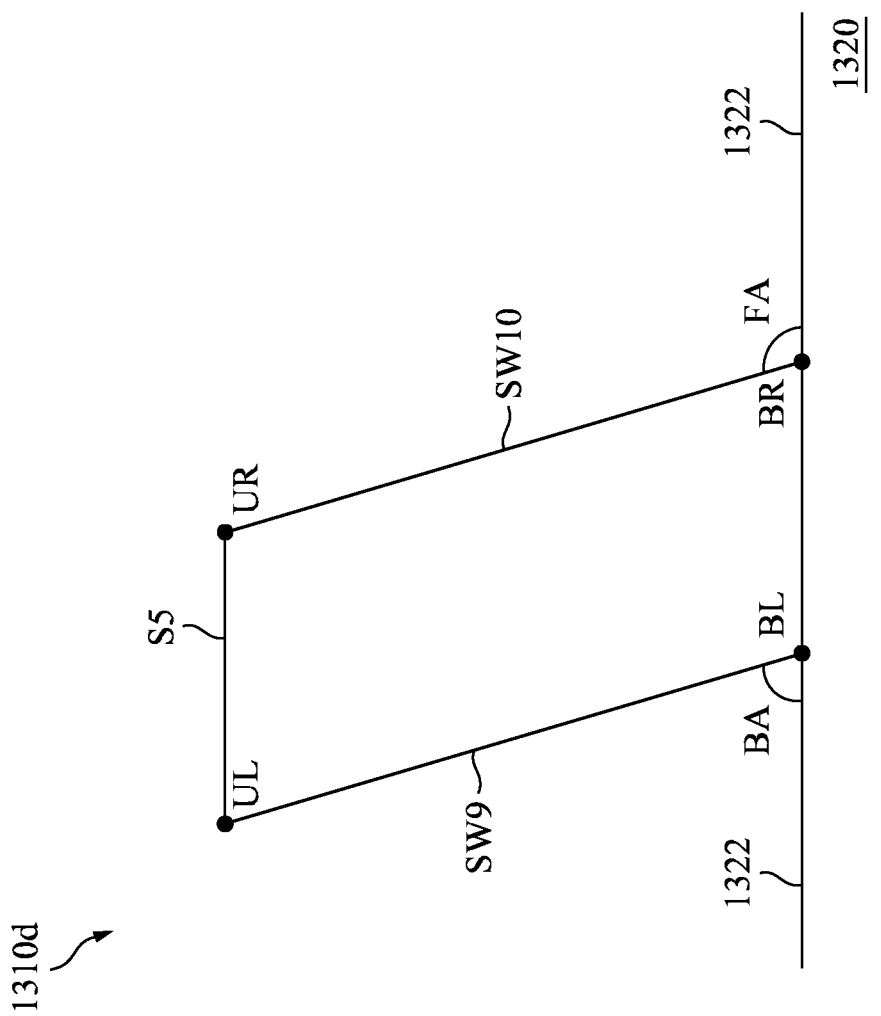
FIG. 6 is an enlargement view of the slanted grating structure of the grating layer of the spectrometer in FIG. 1.

As shown in FIG. 5D, the slanted grating structure 1310d includes a ninth sidewall SW9, a tenth sidewall SW10, and a fifth top surface S5. The ninth sidewall SW9 and the tenth sidewall SW10 are inclined sidewalls. The slanted grating structure 1310d has a height H. In some embodiments, the height H is 0.5 μm. The fifth top surface S5 connects to the ninth sidewall SW9 and the tenth sidewall SW10. With reference to FIG. 6, FIG. 6 is an enlargement view of the slanted grating structure 1310d of the spectrometer 1000 in FIG. 1. The slanted grating structure 1310d is defined by the ninth sidewall SW9, the tenth sidewall SW10, and the fifth top surface S5. The ninth sidewall SW9, the tenth sidewall SW10, and the fifth top surface S5 are defined by a bottom left point BL, a bottom right point BR, an upper left point UL, and an upper right point UR. The ninth sidewall SW9 and a surface 1322 of the slanted grating structure 1310d forms a bottom angle BA, and the tenth sidewall SW10 and the surface 1322 of the slanted grating structure 1310d forms a front angle FA. In some embodiments, the coupling efficiency of the slanted grating structure 1310d is between 60% and 90% in the $T_1$ diffraction light and a spectral range of 300~600 nm with the optical resolution of $$0.97\left(\frac{nm}{\mu m}\right)$$

for the distant layer 1400 having the thickness T of 400 μm. In some embodiments, the slanted grating structures 1310d include different periods P, but have the same slanted angles (such as the bottom angle BA and front angle FA).

Each of the grating structures 1310 includes the binary grating structure 1310a, the step grating structure 1310b, the blazed grating structure 1310c, or the slanted grating structure 1310d. In other words, the grating structures 1310 illustrated in FIG. 1 could be substituted by the grating structures 1310a-1310d illustrated in FIG. 5A to FIG. 5D. It is understood that the higher the order of the diffraction light, the greater the diffraction angle. Therefore, the high order of the diffraction light (such as $T_2$ diffraction light, $T_3$ diffraction light, and so on) would be filtered by changing the width W, the height H, and/or the period P of the grating structures 1310. In some embodiments, the light L having a wavelength in a range from 300 nm to 600 nm diffracts into the distant layer 1400 when the grating structures 1310 have a period around 0.4 μm±0.01 μm. In some embodiments, the light L having a wavelength in a range from 500 nm to 900 nm diffracts into the distant layer 1400 when the grating structures 1310 have a period around 0.65 μm±0.01 μm. In some embodiments, the light L having a wavelength in a range from 800 nm to 1200 nm diffracts into the distant layer 1400 when the grating structures 1310 have a period around 0.9 μm±0.01 μm. In some embodiments, the thickness T of the distant layer 1400 could be adjusted by the incident angle $\theta_{T1}$ of $T_1$ diffraction light transmitted out from the grating substrate 1320.

Although each of the grating structures 1310a-1310d illustrated in FIG. 5A to FIG. 5D has three grating structures 1310a-1310d, the number of the grating structures 1310a-1310d is not limited in the present disclosure. In addition, the grating structures 1310a-1310d could be mirror structures in a lateral symmetry of FIG. 5A to FIG. 5D. In some embodiments, the grating structures 1310 (including the binary grating structure 1310a, the step grating structure 1310b, the blazed grating structure 1310c, or the slanted grating structure 1310d) could include multiple periods for multiple wavelength regions. The wavelength regions may cover 300 nm to 1200 nm. Therefore, the spectrometer 1000 of the present disclosure could cover a wide spectral range.

Figure 7:
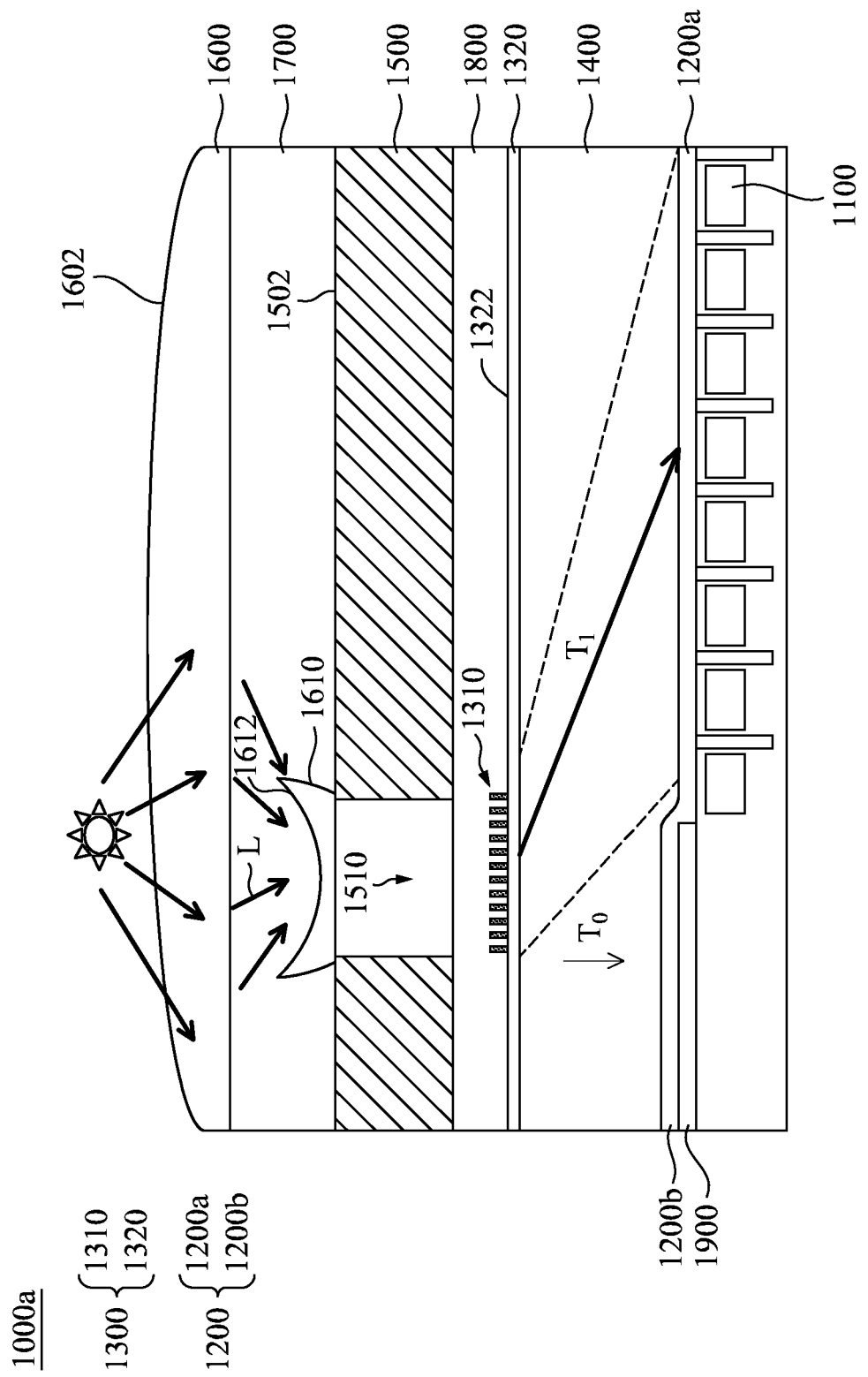
FIG. 7 is a cross-sectional view of a spectrometer in accordance with other embodiments of the present disclosure.

With reference to FIG. 7, FIG. 7 is a cross-sectional view of a spectrometer 1000a in accordance with other embodiments of the present disclosure. Specifically, the spectrometer 1000 in FIG. 1 further includes a second micro-lens 1610 to form the spectrometer 1000a in FIG. 7. With similar features being labeled by similar numerical references, and descriptions of the similar features are not repeated herein. The second micro-lens 1610 is configured to confine the incident angle of the light L and increase the light L entering into the grating structures 1310. The incident angle of the light L is in a range between 0 and ±3 degrees, such as 0.5, 1, 1.5, 2, or 2.5 degrees. Preferably, the incident angle of the light L is 0 degree. The second micro-lens 1610 is aligned with the pin hole 1510 of the collimator 1500, and a second light-receiving surface 1612 of the second micro-lens 1610 is a concave surface. Please refer to FIG. 2A, FIG. 2B, and FIG. 7, it is understood that the plurality of the pin holes 1510 of the collimator 1500, the plurality of the second micro-lens 1610 above the collimator 1500, and the grating structures 1310 are aligned with each other.

FIG. 8A to FIG. 8E are cross-sectional views of various stages of manufacturing a spectrometer in accordance with some embodiments of the present disclosure. It is understood that additional operations can be provided before, during, and after processes shown by FIG. 8A to FIG. 8E, and some of the operations described below can be replaced or eliminated, for additional embodiments of the process. The order of the operations/processes may be interchangeable.

Figure 8C:
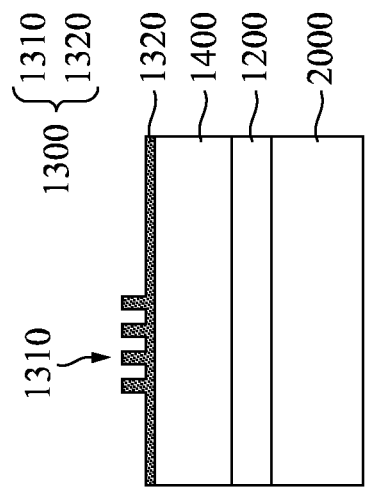
FIG. 8A to FIG. 8E are cross-sectional views of various stages of manufacturing a spectrometer in accordance with some embodiments of the present disclosure.
Figure 8B:
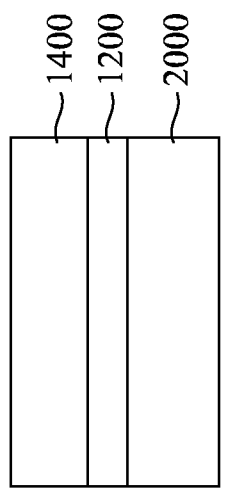
Figure 8A:
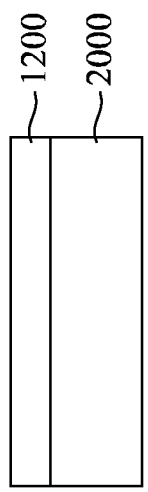
Figure 8E:
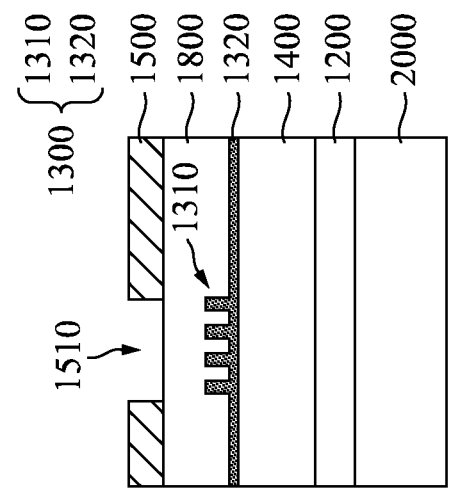
Figure 8D:
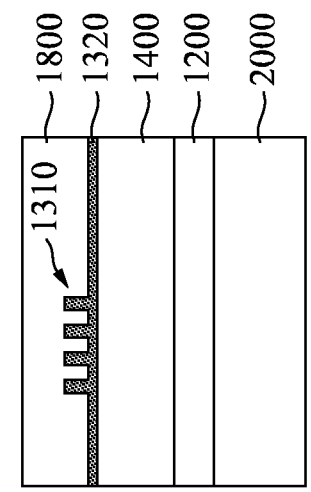

As shown in FIG. 8A, a substrate 2000 is provided, and the anti-reflection layer 1200 is deposited on the substrate 2000. The substrate 2000 could include the plurality of photodetectors 1100 and the plurality of deep trench insulation (DPI) between the photodetectors 1100. The anti-reflection layer 1200 could be formed by depositing multiple films of anti-reflection material, and the deposition method could be physical vapor deposition (PVD). As shown in FIG. 8B, the distant layer 1400 is taped on the anti-reflection layer 1200. As shown in FIG. 8C, the grating layer 1300 (including the grating structures 1310 and the grating substrate 1320) is disposed on the distant layer 1400. Specifically, the grating layer 1300 in FIG. 8C has undergone coating, exposure, development, and etching processes. As shown in FIG. 8D, the cladding layer 1800 is disposed on the grating layer 1300. Specifically, the cladding layer 1800 in FIG. 8D has undergone coating and backing processes. As shown in FIG. 8E, the collimator 1500 with the pin hole 1510 aligned with the grating structures 1310 is disposed on the cladding layer 1800. Specifically, the collimator 1500 in FIG. 8E has undergone coating, exposure, and development processes. It is noticed that the grating structures 1310 and the grating substrate 1320 of the grating layer 1300 in FIG. 8E are formed by the same material.

Figure 9B:
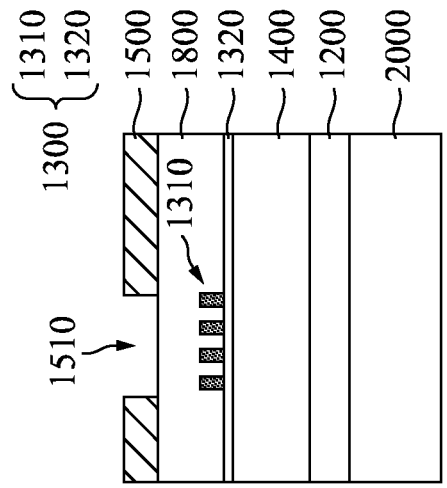
FIG. 9A and FIG. 9B are cross-sectional views of other examples of spectrometers in accordance with some embodiments of the present disclosure.
Figure 9A:
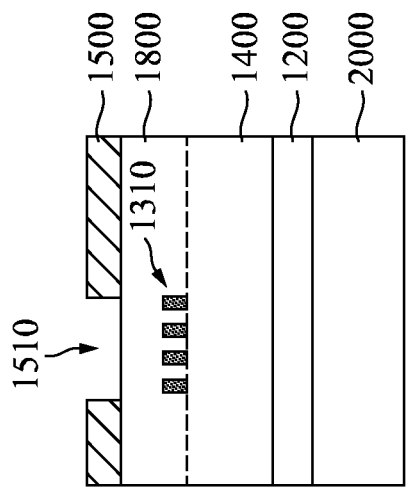

FIG. 9A and FIG. 9B are cross-sectional views of other examples of spectrometers in accordance with some embodiments of the present disclosure. Specifically, in FIG. 9A, the grating substrate 1320 has been completely removed, thereby remaining the grating structures 1310 on the distant layer 1400. In FIG. 9B, the grating structures 1310 and the grating substrate 1320 of the grating layer 1300 are formed by different material.

The spectrometer of the present disclosure includes a distant layer having a thickness at least 400 µm, and the spectrometer has the advantages of a miniaturized size, high resolution of the analysis results, readily integrated with complementary metal-oxide-semiconductor (CMOS) electronics, capable of covering a wide spectral range.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A spectrometer, comprising:
a plurality of photodetectors;
an anti-reflection layer disposed on the plurality of photodetectors;
a grating layer disposed above the anti-reflection layer and comprising a plurality of grating structures to spread a light into a spectrum to the plurality of photodetectors through a distant layer,
wherein the distant layer continuously extends from the grating layer to the anti-reflection layer, the distant layer has a thickness in a range from 400 µm to 2000 µm, and a refractive index of the grating layer is greater than a refractive index of the distant layer;
a collimator disposed above the grating layer, wherein the collimator is configured to confine an incident angle of the light from a first micro-lens and increase a coupling efficiency of the light from the grating layer to the plurality of photodetectors; and
an absorption layer disposed in the anti-reflection layer, wherein the absorption layer is disposed below the grating structures and aside the plurality of photodetectors.

2. The spectrometer of claim 1, wherein the collimator comprises a pin hole aligned with the plurality of grating structures of the grating layer.

3. The spectrometer of claim 2, wherein the pin hole has a width in a range from 0.1 µm to 10 µm.

4. The spectrometer of claim 2, further comprising a second micro-lens aligned with the pin hole of the collimator, wherein a second light-receiving surface of the second micro-lens is a concave surface.

5. The spectrometer of claim 1, wherein a projection of the plurality of grating structures on the anti-reflection layer overlaps a portion of the anti-reflection layer and a portion of the plurality of photodetectors.

6. The spectrometer of claim 1,
wherein the light has a critical angle between the grating layer and the distant layer, and the critical angle is in a range from 22 to 50 degrees,
wherein the light comprises a second order diffraction light after the light propagates from the collimator and couples in the grating layer, and an incident angle of the second order diffraction light is greater than the critical angle,
wherein the light comprises a zero order diffraction light and a first order diffraction light after the light couples out from the grating layer and couples in the distant layer, the absorption layer is configured to receive the zero order diffraction light, and the plurality of photodetectors are configured to receive the first order diffraction light.

7. The spectrometer of claim 6, wherein the anti-reflection layer is a conformal coating on the absorption layer and the plurality of photodetectors.

8. The spectrometer of claim 1, wherein calculating an optical resolution of the light is based on the following equation:

$$\frac{\Delta\lambda}{\Delta L}$$

where $\Delta\lambda$ is a wavelength range of the light, $\Delta L$ is a length difference between L1 and L2, where L1 equals T×tan($\theta$1), L2 equals T×tan($\theta$2), T is the thickness of the distant layer, and $\theta$1 and $\theta$2 respectively are minimum and maximum emergent angles of the light.

9. The spectrometer of claim 8, wherein Δλ is in a range from 300 nm to 600 nm, and $\theta$1 and $\theta$2 ranges from 22.62° to 50.29°.

10. The spectrometer of claim 8, wherein Δλ is in a range from 500 nm to 900 nm, and $\theta$1 and $\theta$2 ranges from 22.62° to 43.81°.

11. The spectrometer of claim 8, wherein Δλ is in a range from 800 nm to 1200 nm, and $\theta$1 and $\theta$2 ranges from 23.58° to 36.87°.

12. The spectrometer of claim 1, wherein each of the plurality of grating structures comprise a binary grating structure, a step grating structure, a blazed grating structure, or a slanted grating structure.

13. The spectrometer of claim 12, wherein the binary grating structure comprises a first vertical sidewall, a second vertical sidewall, and a first top surface,
wherein the first vertical sidewall is parallel to the second vertical sidewall, the first vertical sidewall adjoins and is perpendicular to the first top surface, and the second vertical sidewall adjoins and is perpendicular to the first top surface,
wherein a height of the binary grating structure is in a range from 0.25 μm to 0.4 μm.

14. The spectrometer of claim 12, wherein the step grating structure comprises a first vertical sidewall, a second vertical sidewall, a third vertical sidewall, a fourth vertical sidewall, a first top surface, a second top surface, and a third top surface,
wherein the first vertical sidewall, the second vertical sidewall, the third vertical sidewall, and the fourth vertical sidewall are parallel to each other,
wherein the first top surface, the second top surface, and the third top surface adjoin and are perpendicular to the first vertical sidewall, the second vertical sidewall, the third vertical sidewall, and the fourth vertical sidewall.

15. The spectrometer of claim 12, wherein the blazed grating structure comprises an oblique sidewall extending from a top of the blazed grating structure to a bottom of the blazed grating structure, and a width of the blazed grating structure gradually increases from the top of the blazed grating structure to the bottom of the blazed grating structure.

16. The spectrometer of claim 12, wherein the slanted grating structure comprises a first oblique sidewall, a second oblique sidewall, and a top surface adjoining the first oblique sidewall and the second oblique sidewall.

17. The spectrometer of claim 1, wherein the grating layer further comprises a grating substrate between the plurality of grating structures and the distant layer, and the plurality of grating structures protruding from the grating substrate.

18. The spectrometer of claim 1, wherein the first micro-lens is disposed above the collimator, and a first light-receiving surface of the first micro-lens is a convex surface.

19. The spectrometer of claim 1, further comprising a buffer layer disposed between the first micro-lens and the collimator, and a refractive index of the buffer layer is in a range from 1.5 to 2.2.

20. The spectrometer of claim 1, further comprising a cladding layer disposed between the grating layer and the collimator, wherein the refractive index of the grating layer is greater than a refractive index of the cladding layer, the refractive index of the cladding layer is in a range from 1.5 to 2.2, and the refractive index of the distant layer is in a range from 1.5 to 2.2.

* * * * *